United States Patent
Trossen et al.

(10) Patent No.: US 10,122,632 B2
(45) Date of Patent: Nov. 6, 2018

(54) ANCHORING IP DEVICES IN ICN NETWORKS

(71) Applicant: IDAC HOLDINGS, INC., Wilmington, DE (US)

(72) Inventors: Dirk Trossen, London (GB); Sebastian Robitzsch, London (GB)

(73) Assignee: IDAC Holdings, Inc., Wilmington, DE (US)

( * ) Notice: Subject to any disclaimer, the term of this patent is extended or adjusted under 35 U.S.C. 154(b) by 23 days.

(21) Appl. No.: 15/518,688

(22) PCT Filed: Oct. 14, 2015

(86) PCT No.: PCT/US2015/055553
§ 371 (c)(1),
(2) Date: Apr. 12, 2017

(87) PCT Pub. No.: WO2016/061243
PCT Pub. Date: Apr. 21, 2016

(65) Prior Publication Data
US 2017/0237660 A1    Aug. 17, 2017

Related U.S. Application Data

(60) Provisional application No. 62/188,001, filed on Jul. 2, 2015, provisional application No. 62/063,746, filed on Oct. 14, 2014.

(51) Int. Cl.
*H04L 12/741*        (2013.01)
*H04L 12/745*        (2013.01)
(Continued)

(52) U.S. Cl.
CPC .......... *H04L 45/745* (2013.01); *H04L 45/741* (2013.01); *H04L 45/748* (2013.01);
(Continued)

(58) Field of Classification Search
None
See application file for complete search history.

(56) References Cited

U.S. PATENT DOCUMENTS 8,244,881 B2   8/2012   Thornton et al.
8,923,293 B2   12/2014  Jacobson et al.
(Continued)

OTHER PUBLICATIONS

Shida, "Mastering TCP/IP Ver. IPv6," 2nd Ed., pp. 285-294 (2013).
(Continued)

*Primary Examiner* — Candal Elpenord
(74) *Attorney, Agent, or Firm* — Volpe and Koenig, P.C.

(57) ABSTRACT

Procedures, methods and architectures for anchoring communication between IP-based devices in an ICN network or across an IP peer network are disclosed. Embodiments may enable the communication between two IP-based devices connected to an ICN, or one IP-based device connected to an ICN network while another IP-based device is connected either to an ICN network or IP network. In an embodiment, IP packets originating from an IP-based device may be encapsulated into ICN packets and forwarded via an ICN network. In an embodiment, IP packets received via an ICN network may be encapsulated in ICN packets and forwarded to an IP-based device. In an embodiment, IP packets originating from an IP-based device may be forwarded and received via an ICN network towards another IP network. In an embodiment, IP packets received by an ICN network may be forwarded towards an IP-based device via the ICN network.

20 Claims, 12 Drawing Sheets

(51) Int. Cl.
H04L 29/08 (2006.01)
H04L 12/749 (2013.01)
H04L 29/12 (2006.01)

(52) U.S. Cl.
CPC ............ *H04L 61/15* (2013.01); *H04L 61/304* (2013.01); *H04L 67/12* (2013.01); *H04L 67/2842* (2013.01); *H04L 2212/00* (2013.01)

(56) References Cited

U.S. PATENT DOCUMENTS

| | | | |
|---|---|---|---|
| 9,185,186 B2 | 11/2015 | Hong et al. | |
| 2002/0009079 A1* | 1/2002 | Jungck | H04L 29/12066 370/389 |
| 2009/0285209 A1 | 11/2009 | Stewart et al. | |
| 2015/0381557 A1* | 12/2015 | Fan | H04L 61/10 709/245 |

OTHER PUBLICATIONS

IEEE P802.11ah/D2.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D2.0 (Jun. 2014).

Jacobson et al., "Networking Named Content," CoNEXT Proceedings of the 5th Internet Conference on Emerging Networking Experiments and Technologies, Rome, Italy, pp. 1-12 (2009).

Trossen et al., "Designing and Realizing an Information-centric Internet," IEEE Communications Magazine, vol. 50, No. 7 (Jul. 2012).

Xylomenos et al., "Socket Emulation over a Publish/Subscribe Network Architecture," Proceedings of the Future Network and Mobile Summit, pp. 1-5 (Jun. 2010).

* cited by examiner

ANCHORING IP DEVICES IN ICN NETWORKS

CROSS REFERENCE TO RELATED APPLICATIONS

This application is the U.S. National Stage, under 35 U.S.C. § 371, of International Application No. PCT/US2015/055553 filed Oct. 14, 2015, which claims the benefit of U.S. provisional application No. 62/063,746 filed on Oct. 14, 2014 and U.S. provisional application No. 62/188,001 filed on Jul. 2, 2015, the contents of which are hereby incorporated by reference herein.

BACKGROUND

Path-oriented networks, such as in areas of information-centric networking (ICN) focus on the routing of information rather than merely sending bit packets from endpoint A to endpoint B as in Internet Protocol (IP) networking. In path-oriented networks, data becomes independent from location, application, storage, and means of transportation, enabling in-network caching and replication.

SUMMARY

In an embodiment, a method, system, and apparatus for anchoring communication between Internet Protocol (IP)-based devices in an information centric networking (ICN) network or across an IP peer network are disclosed. The embodiment may include: determining an appropriate ICN name for an IP address; constraining the ICN with additional identification information; and encapsulating an IP packet into an ICN packet.

In an embodiment, a method, system, and apparatus for communicating between Internet Protocol (IP)-based devices in an information centric networking (ICN) network or across an IP peer network are disclosed. The embodiment may include: an IP-based wireless transmit/receive unit (WTRU) and an ICN network attachment point (NAP). In addition, the embodiment may include an IP border gateway (GW) and an ICN border GW.

BRIEF DESCRIPTION OF THE DRAWINGS

A more detailed understanding may be had from the following description, given by way of example in conjunction with the accompanying drawings wherein.

DETAILED DESCRIPTION

Information-centric networking (ICN) may constitute a new paradigm in which content is exchanged by means of information addressing. Appropriate networked entities that are suitable to act as a source of information towards the networked entity that requested the content may be connected.

Architectures have been proposed for ICN, many of which may require the partial replacement of current network infrastructure in order to realize the desired network-level functions. The proposed architectures may be realized as an overlay over existing (e.g., Internet Protocol (IP) or local Ethernet-based) architectures. Such migration, however, would still require the transition of the user equipment (UE) to an ICN-based solution.

With IP-based applications providing a broad range of Internet services currently in use, transitioning all of these applications may be a much harder task than the pure transition of the network-level functionality (e.g., protocol stack implementation) in the UE since it also requires the transition of the server-side components, (e.g., e-shopping web-servers and alike). Accordingly, IP-based services, and with them purely IP-based wireless transmit and receive units (WTRUs), may continue to be used in the future even as ICN networking continues to grow. The transition to ICN at the network level, on the other hand, may be very promising. ICN may bring advantages such as, for example, increased efficiency through the usage of in-network caches and the spatial/temporal decoupling of sender/receiver in general.

Embodiments described herein may focus on bringing these two trends together. In other words, embodiments may include the transition of IP networks towards an ICN mode of operation, while realizing the communication of IP-based services and applications in such an environment. In order to achieve such combination, embodiments may include methods and a system in which IP-based devices can communicate while being attached to an ICN network. In an embodiment, the communication may take place with IP devices that are connected to the ICN network or a standard IP network.

More specifically, embodiments may include: methods and procedures to forward IP packets originating from an IP-only device, via an ICN; methods and procedures to forward IP packets towards an IP-only device, the IP packets received via an ICN; methods and procedures to forward IP packets originating from an IP-only device and received via an ICN towards another IP network; and methods and procedures to forward IP packets towards an IP-only device via an ICN, the IP packets received via an IP network.

Figure 1A:
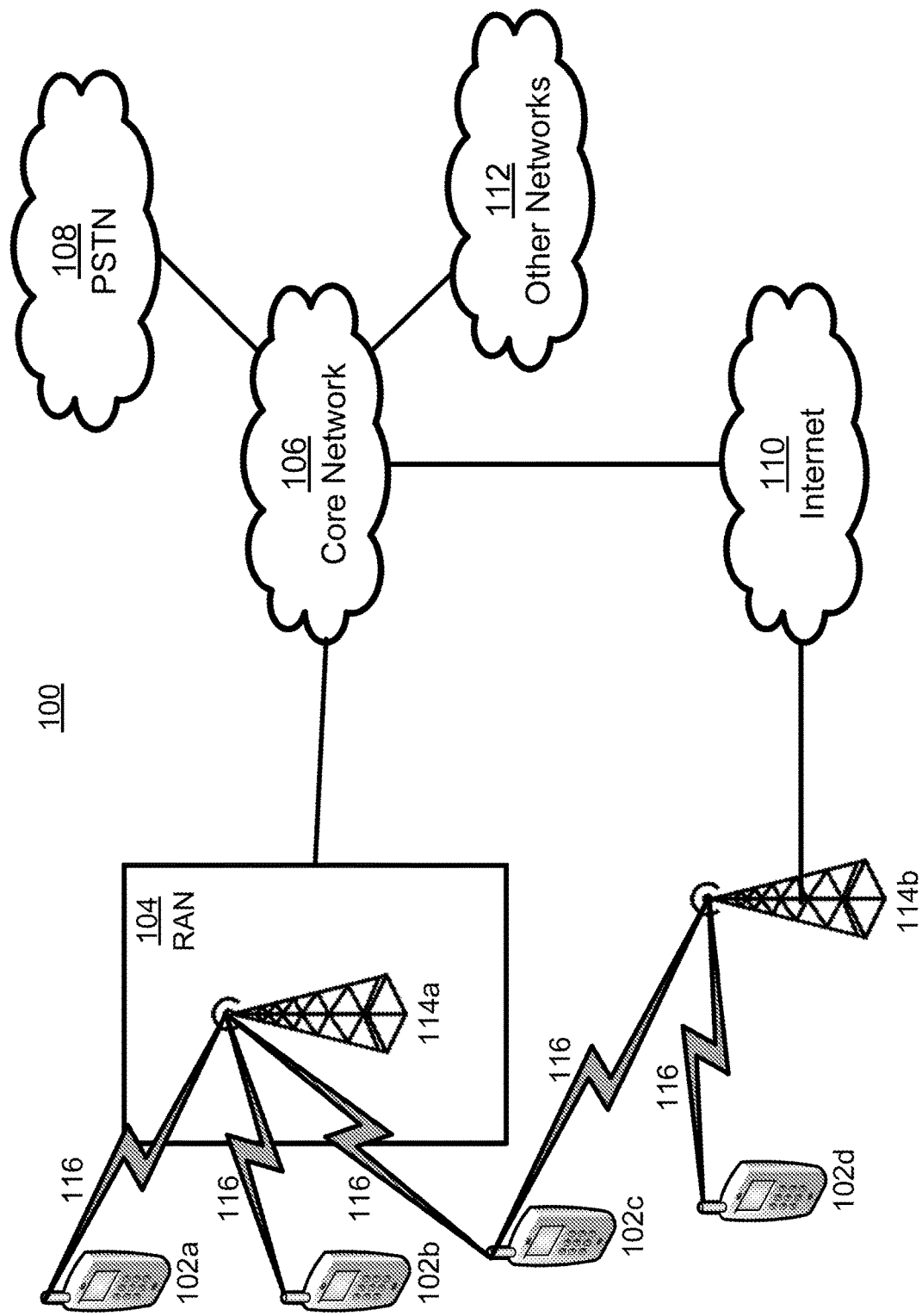
FIG. 1A is a system diagram of an example communications system in which one or more disclosed embodiments may be implemented.

Referring now to FIG. 1A, a diagram of an example communications system 100 in which one or more disclosed embodiments may be implemented is shown. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
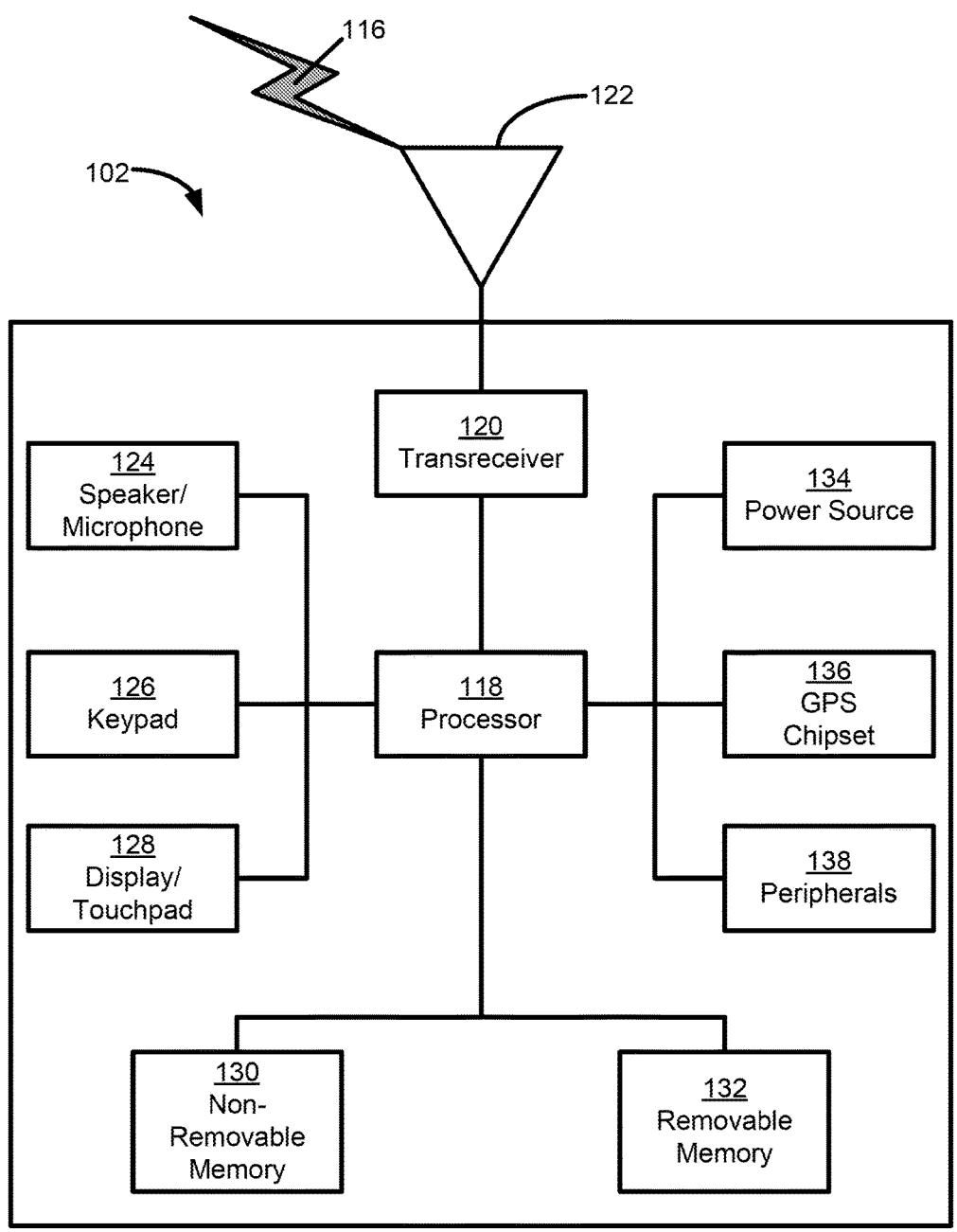
FIG. 1B is a system diagram of an example wireless transmit/receive unit (WTRU) that may be used within the communications system illustrated in FIG. 1A.

Referring now to FIG. 1B, a system diagram of an example WTRU 102 is shown. The WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
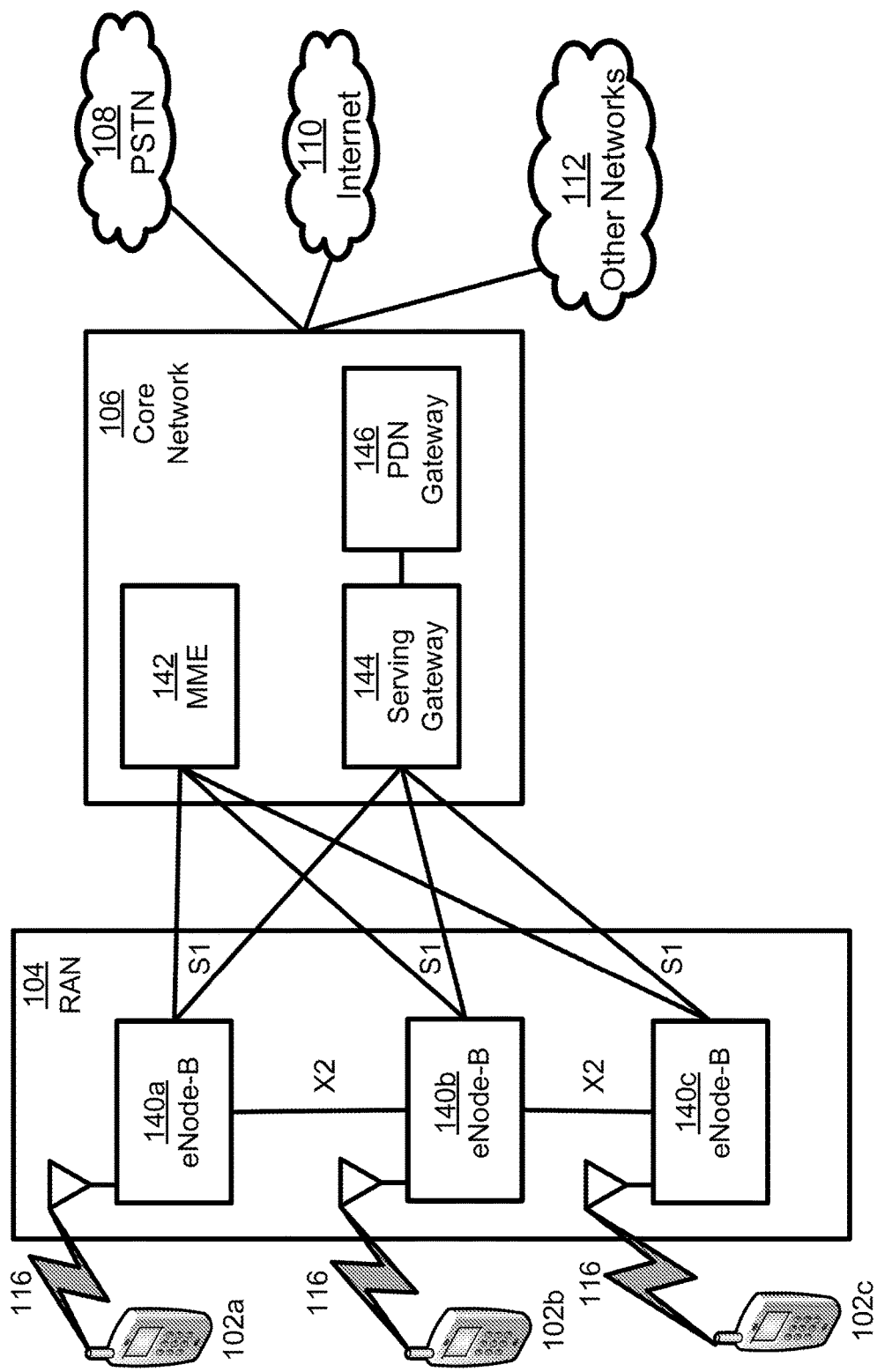
FIG. 1C is a system diagram of an example radio access network and an example core network that may be used within the communications system illustrated in FIG. 1A.

Referring now to FIG. 1C, a system diagram of the RAN 104 and the core network 106 according to an embodiment is shown. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1D:
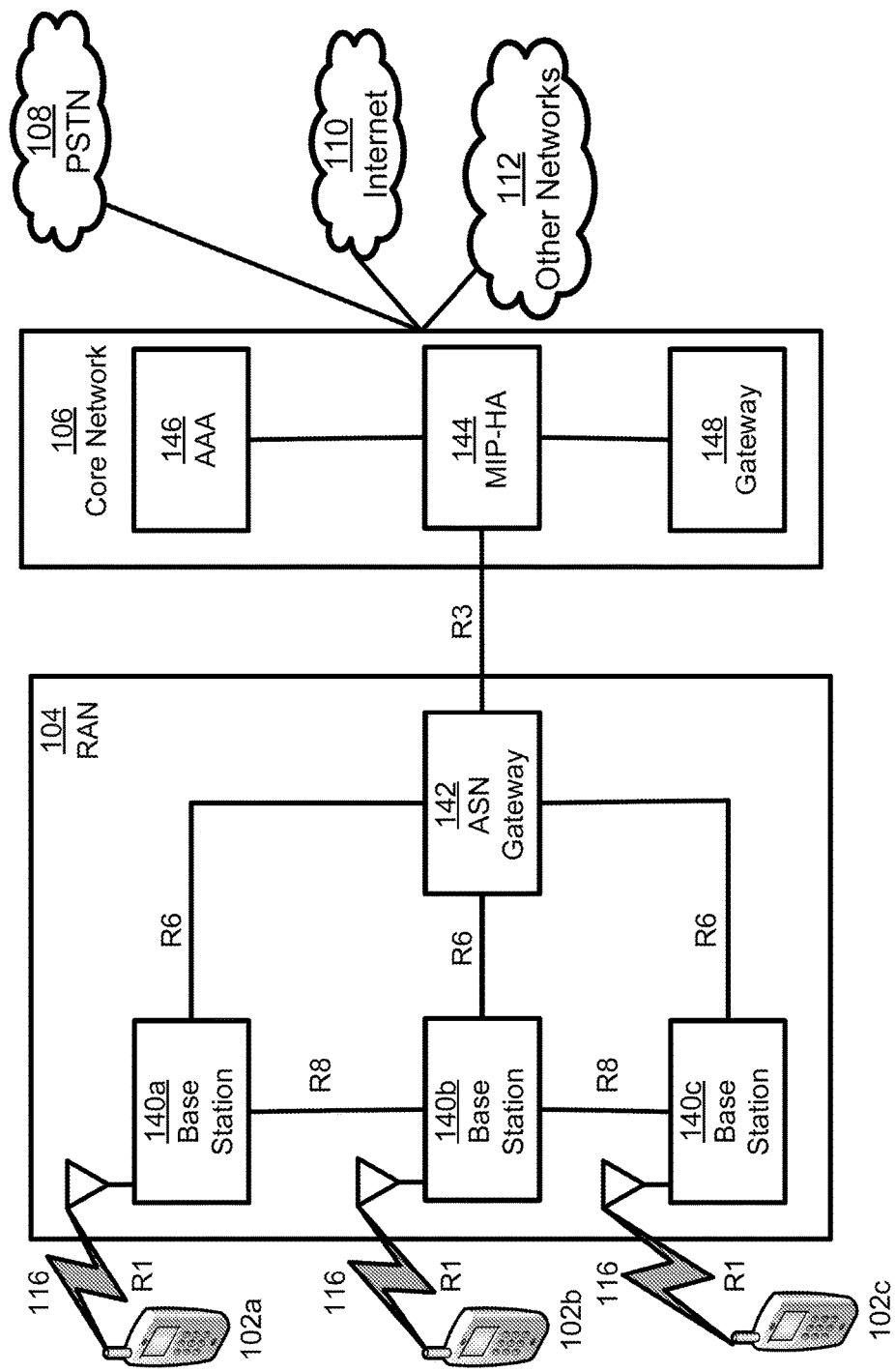
FIG. 1D is a system diagram of another example radio access network and another example core network that may be used within the communications system illustrated in FIG. 1A.

Referring now to FIG. 1D, a system diagram of the RAN 104 and the core network 106 according to another embodiment is shown. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1D, the RAN 104 may include base stations 150a, 150b, 150c, and an ASN gateway 152, though it will be appreciated that the RAN 104 may include any number of base stations and ASN gateways while remaining consistent with an embodiment. The base stations 150a, 150b, 150c may each be associated with a particular cell (not shown) in the RAN 104 and may each include one or more transceivers for communicating with the WTRUs 102a, 102b, 102c over the air interface 116. In one embodiment, the base stations 150a, 150b, 150c may implement MIMO technology. Thus, the base station 150a, for example, may use multiple antennas to transmit wireless signals to, and receive wireless signals from, the WTRU 102a. The base stations 150a, 150b, 150c may also provide mobility management functions, such as handoff triggering, tunnel establishment, radio resource management, traffic classification, quality of service (QoS) policy enforcement, and the like. The ASN gateway 152 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 150a, 150b, 150c may be defined as an R8 reference point that includes protocols for facilitating WTRU handovers and the transfer of data between base stations. The communication link between the base stations 150a, 150b, 150c and the ASN gateway 152 may be defined as an R6 reference point. The R6 reference point may include protocols for facilitating mobility management based on mobility events associated with each of the WTRUs 102a, 102b, 102c.

As shown in FIG. 1D, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 154, an authentication, authorization, accounting (AAA) server 156, and a gateway 158. While each of the foregoing elements are depicted as part of the core network 106, it will be appreciated that any one of these elements may be owned and/or operated by an entity other than the core network operator.

The MIP-HA 154 may be responsible for IP address management, and may enable the WTRUs 102a, 102b, 102c to roam between different ASNs and/or different core networks. The MIP-HA 154 may provide the WTRUs 102a, 102b, 102c with access to packet-switched networks, such as the Internet 110, to facilitate communications between the WTRUs 102a, 102b, 102c and IP-enabled devices. The AAA server 156 may be responsible for user authentication and for supporting user services. The gateway 158 may facilitate interworking with other networks. For example, the gateway 158 may provide the WTRUs 102a, 102b, 102c with access to circuit-switched networks, such as the PSTN 108, to facilitate communications between the WTRUs 102a, 102b, 102c and traditional land-line communications devices. In addition, the gateway 158 may provide the WTRUs 102a, 102b, 102c with access to the networks 112, which may include other wired or wireless networks that are owned and/or operated by other service providers.

Although not shown in FIG. 1D, it will be appreciated that the RAN 104 may be connected to other ASNs and the core network 106 may be connected to other core networks. The communication link between the RAN 104 and the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

In embodiments described herein, a Network Access Point (NAP) may provide a standard IP network interface towards an IP-enabled device. The NAP may encapsulate any received IP packet into an ICN packet which may then be published as an appropriately formed named information item. Conversely, the NAP may subscribe to any appropriately formed named information items, where the information identifier may represent any IP device locally connected to the NAP. Any received ICN packet may then be forwarded to the appropriate local IP device after being appropriately decapsulated, thereby recovering the original IP packet. Additionally, embodiments may describe the operation of an ICN border gateway (BGW). The BGW may receive ICN packets from NAPs in its network that are destined to IP devices outside of its network and may then forward these packets towards the appropriate IP networks. Conversely, any received IP packet at the BGW may be forwarded to the appropriate IP-based device in its local ICN network.

Embodiments described herein may be based on the concept that an IP device is interpreted as a named entity for a channel being established between one such IP device and another. Hence, any communication to an IP device with an IP endpoint identifier $A_{IP}$ may be interpreted as sending data (via a channel) to an information item named $A_{ICN}$. In other words, any IP device wanting to communicate with device $A_{IP}$ would publish its IP packets to the information item $A_{ICN}$, while device $A_{IP}$ itself would subscribe to said information item $A_{ICN}$. It should be noted that it may not be necessary to ensure that only the device $A_{IP}$ will be able to subscribe to $A_{ICN}$, since various ICN procedures may provide various access control mechanisms to ensure such restriction. Conventional methods of IP-ICN integration may involve inserting a "shim" layer between IP-based applications and a pure ICN networking stack, requiring that the network protocol implementations in the WTRU be migrated from IP operations to ICN operation. In contrast, embodiments described herein may allow for communication of pure IP devices within and across an ICN network.

Embodiments may rely on fundamental assumptions regarding the service model as well as the information items provided by the ICN architecture. Specifically, it may be assumed that a push-based (e.g., publish-subscribe service) model is exposed and mutable information items (i.e., being able to republish different content under an already published ICN name) may be supported. These assumptions may be based on, for instance, by the PURSUIT project architecture.

In an embodiment, the IP address of any device communicating in the ICN network may be interpreted as a communication pertaining to an appropriate ICN name. The communication may follow a channel semantic in the sense that the IP packets transmitted via this channel (defined through the appropriate ICN name) may be mutable information items at the ICN level. In this example, it may mean that IP packets transmitted to a device with IP address $A_{IP}$ are actually published to a mutable content named $A_{ICN}$ (where the content is mutable because the same name may be used for the mutable content that is defined by the IP packets transmitted to this IP address). Furthermore, any IP address residing outside the ICN network may be accordingly encoded as an appropriate ICN name.

For the overall ICN name space for the methods described herein, a separate scope identifier may be used, even a root identifier may be chosen for IP-like communication. Using, for instance, a root identifier, may allow for separating IP-like communication from other ICN communication for operational or migration reasons. The root identifier may be standardized, agreed upon in an appropriate forum or simply defined in a proprietary manner across ICNs of a certain vendor and/or operator.

Under this root scope identifier, there may be two sub-scope identifiers, one for communication within the ICN network (denoted I) and one for communication to IP addresses outside the ICN network (denoted O). Under each of these sub-scope identifiers, there may be different levels of sub-hierarchies that may be established, similar to those foreseen by IPv4 and IPv6 naming standards. If an IPv4 address is used (e.g., A.B.C.D), the hierarchy of ICN names may be realized as A class→B class→C class→D class. Each specific IP address following the hierarchical IP addressing may therefore be mapped onto an ICN name of the sort of $f(A)/f(B)/f(C)/f(D)$. The prefix $f$ may denote a function that operates on the original 8 bit input provided by the IP sub-hierarchies and produces an ICN-compliant identifier.

In the case of PURSUIT, for example, this function may be a choice of a hash function operating on 8 bit inputs and providing 256 bit (i.e., the PURSUIT identifier length) output for each sub-identifier $f(x)$. Any such hash function may need to comply with the requirements of the ICN architecture, for example, to produce statistically unique identifiers. Similar organization principles may be devised for IPv6 addresses and may be left out for the sake of simplicity.

Figure 2:
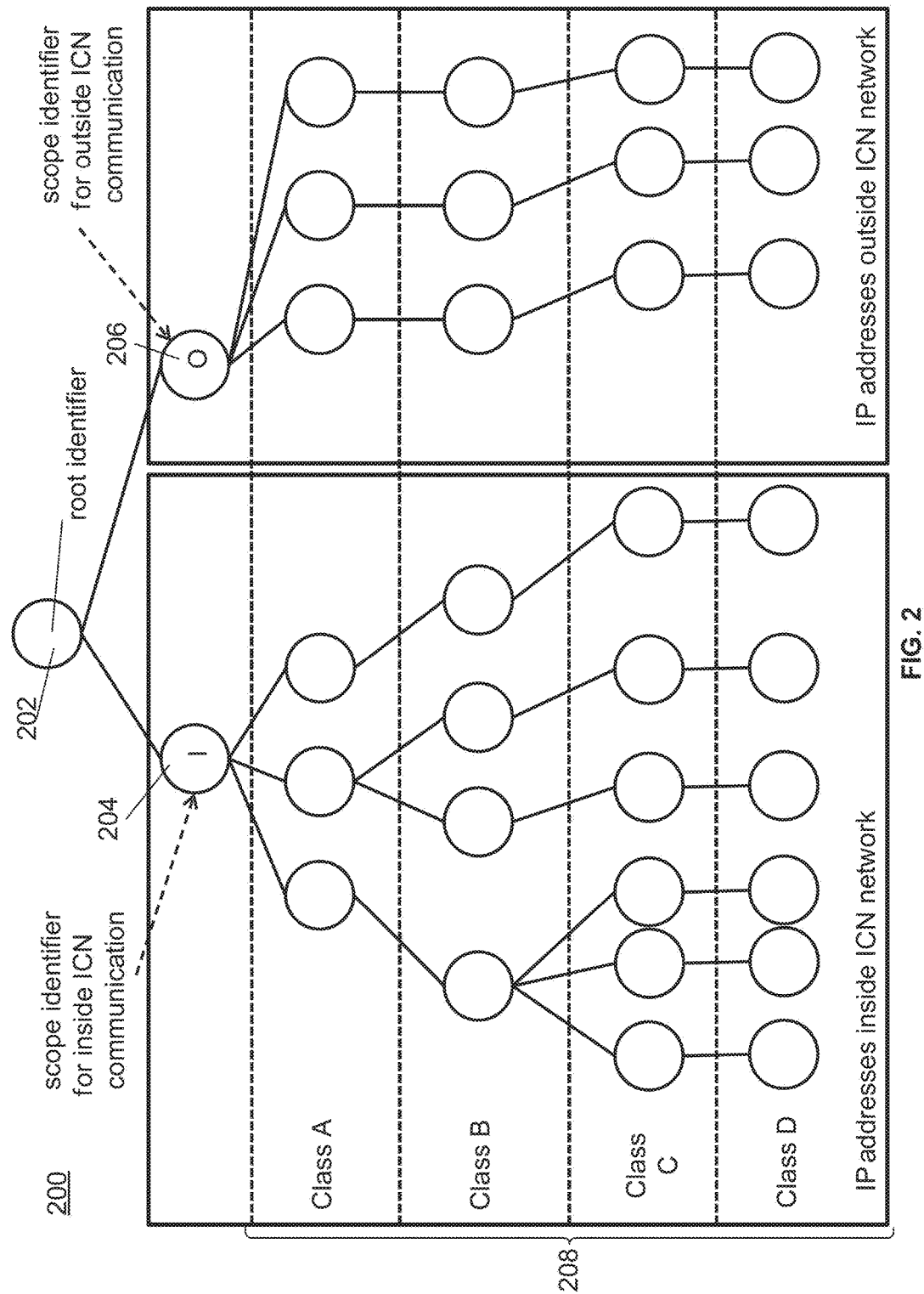
FIG. 2 is a diagram of an ICN name space using IPv4 addresses.

Referring now to FIG. 2, a diagram 200 of an ICN name space using IPv4 addresses is shown. FIG. 2 includes a single root identifier 202 for the IP over ICN communication, two sub-scope identifiers for the within ICN 204 and outside ICN communication 206, and the hierarchies of IP subnet identifiers 208 under each of these sub-scopes.

Architectures such as NDN use standard DNS names as ICN content identifiers as well as rely on a pull-based service model for retrieving ICN packets.

In addition to generating appropriate ICN names at the level of IP endpoint identifiers, an extended approach may utilize additional information of the IP-level communication as additional information to further constrain the communication being exchanged. Such constraining information may be the source and/or destination port as well as the source IP address. In other words, the ICN name in the form of /Root/I//$f(A)/f(B)/f(C)/f(D)$ may be extended by, for example, the port information towards the ICN name of /Root/I/$f(A)/f(B)/f(C)/f(D)/f$(port) with "port" being a 16 bit integer value according to existing IP standards. When using several constraining parameters, a tuple input may be used for the function $f$. The extended form of ICN name may be used for constraining communication to specific services only, these services defined through their port information. Other constraints similar to ports may be added to the ICN name, such as destination port or other application flow specifying information.

An interest in an appropriate ICN name may be indicated. A publish-subscribe model may be assumed as the underlying semantic for the ICN network, for example, ICN information items may be published by an ICN entity and retrieved by subscribing to it at another ICN entity. The interest indication may be removed from the ICN network by unsubscribing from the ICN name.

Interest in an entire IP subnet communication may be indicated. Architectures may provide an interest indication in entire sets of information items by subscribing to the next level hierarchy in an appropriate ICN name. With this, interest in an entire subnet communication may be indicated by subscribing to, say, /Root/I/$f$(A)/$f$(B)/$f$(C) instead of using the full IP address of a specific device. With this, any packets transmitted to devices located in the subnet may be transmitted to the subscriber to this sub-hierarchy.

Furthermore, interest may be indicated into all communication between IP devices within the ICN network by subscribing to /Root/I. Conversely, communication to any IP device outside the ICN network may be indicated by subscribing to /Root/O.

Interest in constrained communication may be indicated. An appropriate ICN name may be further described by port information (or other constraining information). This may allow for constraining the transmitting/receiving of IP-level communication to particular ports only, akin to an IP-level firewall. Hence, by subscribing to such extended appropriate ICN name, only information that is destined for a particular port at a particular IP device, as described in the appropriate ICN name, may be received, enabling flow-based management at the IP level, for example, for QoS management or other flow-based management functions, such as analytics or similar.

In an example, IP packets may be encapsulated in ICN packets. A generic ICN packet format may be assumed, consisting of the ICN name, a possible options header, and the payload. The encapsulation of IP packets may include inserting the appropriate ICN name (determined by the IP address of the destination of the IP packet according to the methods described above, as well as any constraining information that is added to the communication) into the appropriate packet header. Any appropriate options may be set in the option header and then the entirety of the IP packets may be copied into the payload of the ICN packet.

The necessity to fragment an ICN packet in smaller chunks may be transparent to the encapsulation of the IP packet. Due to the realization at the IP level, any protocol being realized on top of IP (e.g., TCP, RTP or HTTP), may communicate via the mechanisms described herein. This may be done relying on the encapsulation of, for example, TCP packets into IP packets, which in turn may be encapsulated into ICN packets. In an example of a TCP-based application running at the WTRU with IP address IPA wanting to communicate with a server located at IP address IPB, the NAP to which the WTRU is connected may encapsulate any received packet from this WTRU into an ICN packet with the appropriate ICN name /Root/I/$f$(IP$_A$), assuming the server resides inside the ICN network (which may be determined through a subnet check).

Figure 3:
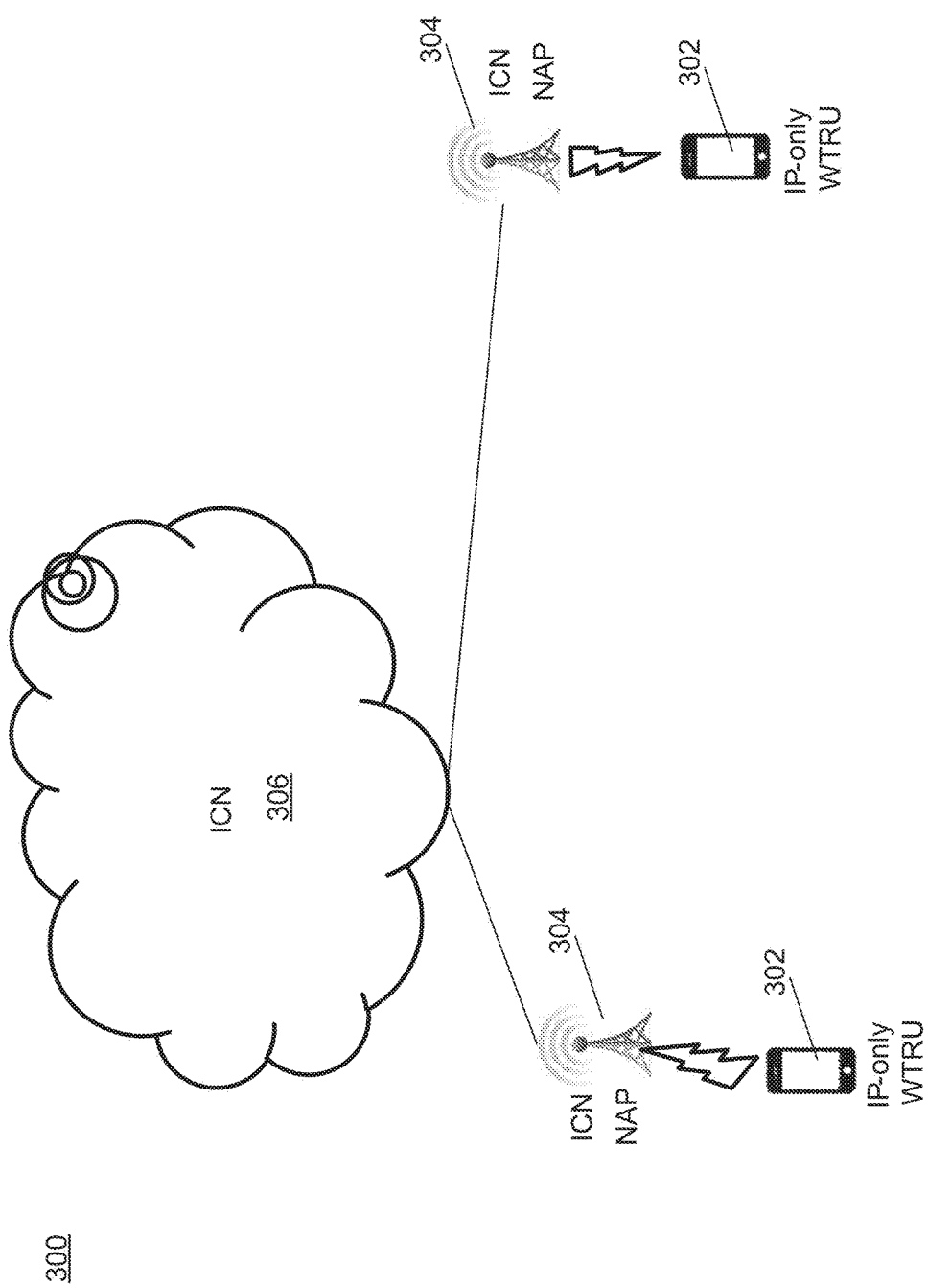
FIGS. 3 and 4 are diagrams of system components for communication within an information-centric networking (ICN) environment and between an ICN environment and an Internet Protocol (IP) environment, respectively.
Figure 4:
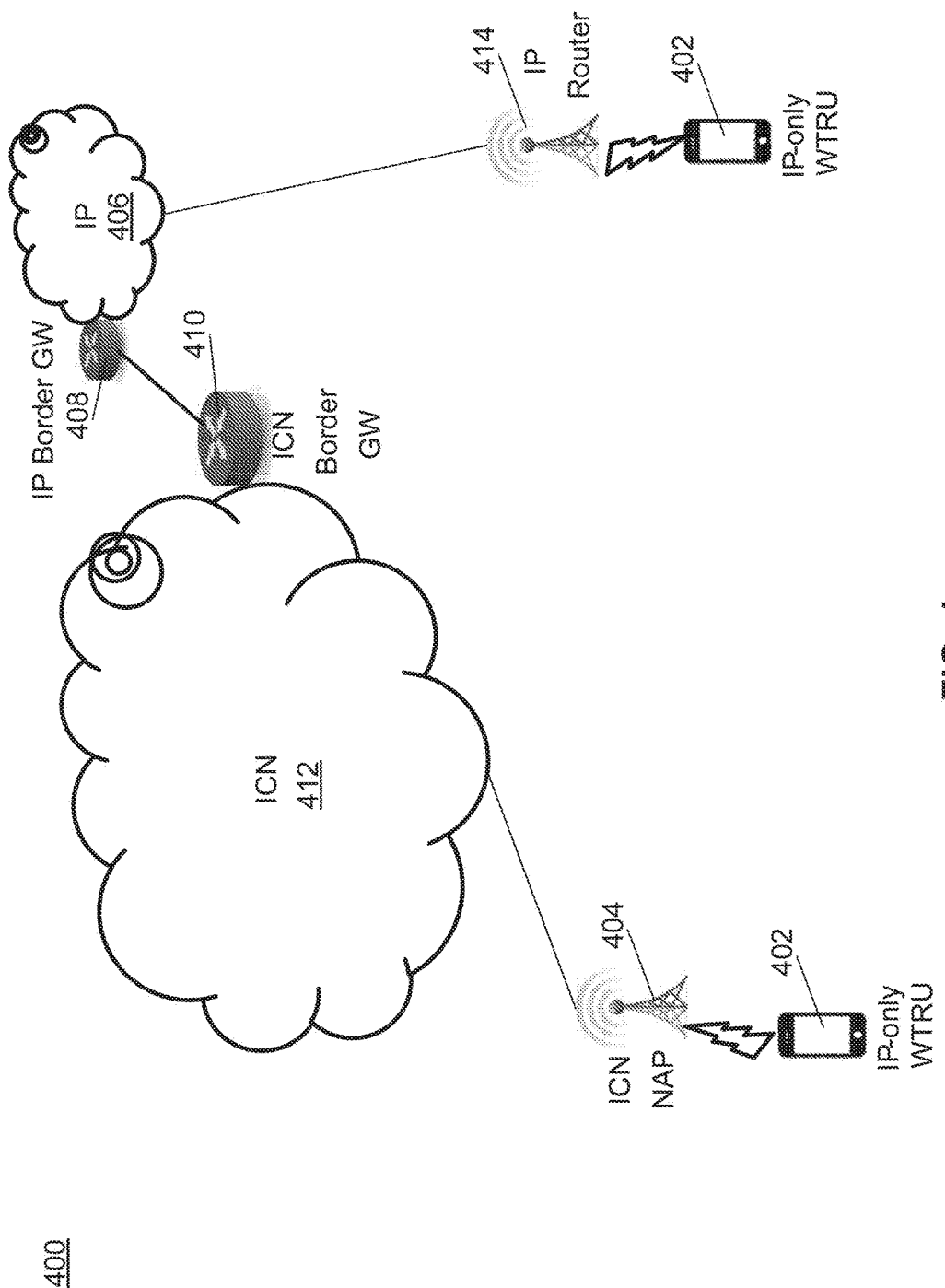

Referring now to FIG. 3 and FIG. 4, diagrams of system components for communication within an ICN environment 300 and between an ICN environment and an IP environment 400, respectively, are shown. As shown in FIG. 3, the system for communication within an ICN environment may include one or more IP-based WTRUs 302, one or more ICN network attachment points (NAPs) 304, and the ICN network 306. As shown in FIG. 4, the system for communication between an ICN environment and an IP environment may include one or more IP-based WTRUs 402, one or more ICN NAPs 404, the IP network 406, an IP border GW 408, an ICN border GW 410, and the ICN network 412. In an embodiment, the IP Border GW 408 and IP Router 414 may be standard IP network elements used in IP networks. In an embodiment, the IP-based WTRUs 402 may be configured to work only with an IP network 406 (i.e., IP-only WTRUs).

An IP-only WTRU that executes any standard IP-enabled application and service (by transmitting and receiving IP packets at its network interface) in collaboration with some other IP-only WTRU may be disclosed herein. The latter located either in an ICN network, as illustrated in FIG. 3, or in an IP-based network, as illustrated in FIG. 4.

A number of ICN NAPs 304, 404 may receive IP packets from the WTRU 302, 402 encapsulating such packets into an appropriate ICN format and publishing the ICN packet to an appropriate ICN name in its local ICN network 306, 412. The number of ICN NAPs 304, 404 may receive ICN packets from its local ICN network 306, 412, decapsulating the payload of the ICN packet as an IP packet and transmitting the IP packet to the appropriate network interface, based on the appropriate ICN name information provided in the ICN packet. The number of ICN NAPs 304, 404 may register interest in appropriate ICN names on behalf of the locally connected IP-based WTRUs 302, 402.

An ICN Border GW 410 may receive ICN packets from its local ICN network 412, decapsulating such packets as an IP packet and transmitting the IP packet to one of its IP peer networks 406 via one of its IP-based network interfaces. The ICN Border GW 410 may receive IP packets from one of its IP peer networks 406 encapsulating such packets into an ICN packet and publishing the ICN packet to an appropriate ICN name in its local ICN network 412. The ICN Border GW 410 may register interest in IP packets on behalf of the IP address space locally allocated to the ICN network 412. The ICN Border GW 410 may register interest in appropriate ICN names on behalf of the local ICN network 412.

The IP Border GW 408 and IP Router 414 in FIG. 4 may be standard IP network elements used in IP networks.

Figure 5:
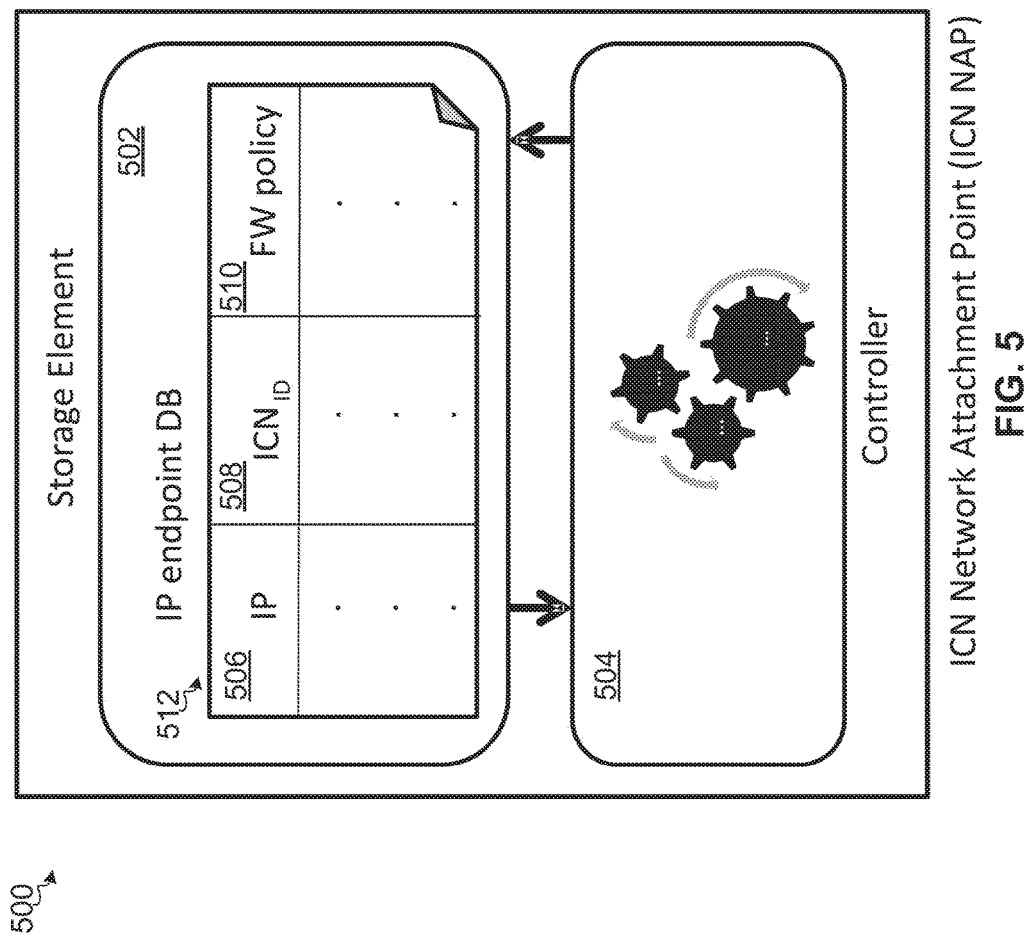
FIG. 5 is an ICN Network Attachment Point (NAP)

Referring now to FIG. 5, an ICN Network Attachment Point (NAP) 500 is shown. The ICN NAP's 500 elements may include a storage element 502 and a controller 504.

The storage element holding an IP endpoint database 512 may have the following columns: IP endpoint information 506, either as IPv4 or IPv6 identifier; ICN identifier information ICN$_{ID}$ 508 for this IP endpoint identifier; and a Firewall (FW) policy entry 510 that may include port limitations of the particular IP device.

The controller 504 may implement the reception of IP packets from locally connected WTRUs, transmitting via the local network interface, the encapsulation of IP packets into ICN packets in an ICN-specific format; the retrieval of the appropriate ICN name, in relation to the destination as given in the received IP packet, from the IP endpoint database 512, the addition of the appropriate ICN name to the generated ICN packet, and the publication of the ICN packet to its local ICN network.

Alternatively, the controller 504 may implement the generation of an appropriate ICN name in case the corresponding IP identifier may not be found in the IP endpoint database 512 and the insertion of this ICN name into the database 512 for future references. Alternatively, the controller 504 may implement the generation of a set of appropriate ICN names in case the corresponding IP identifier may not be found; the set of ICN names representing constrained communication identifiers according to the FW policy 510 in the IP endpoint database 512. Alternatively, the controller 504 may implement the discarding of the IP packet in case of a violation of the NAP local FW policy 510, for example, by using an outgoing port that is prohibited, may be realized.

The controller 504 may also implement the reception of an ICN packet from its local ICN network, followed by the decapsulation of the IP packet within the ICN packet according to an ICN-specific format, the retrieval of the IP endpoint identifier 506, in relation to ICN name as given in the received ICN packet, from the IP endpoint database 512, and the transmission of the IP packet to the appropriate local network interface.

Alternatively, an appropriate ICN name to be inserted into the IP endpoint database 512 may be created. Alternatively, an appropriate ICN name constrained by the port information given in the IP packet may be created.

Alternatively, the packet may be discarded in case no IP endpoint identifier 506 was found. This IP endpoint identifier 506 may be a constrained one; not finding one may mean it was not created in the IP endpoint database 512 due to FW policy restrictions, meaning that communication over this port is prohibited.

In the case of the WTRUs attaching to the NAP 500, the registration of interest in appropriate ICN names by determining the appropriate ICN name based on the IP endpoint identifier 506 given to the local attached WTRU and indicating the interest in packets transmitted to this ICN name to the local ICN network.

Alternatively, FW policy 510 according to some NAP local administration rule may be added, further constraining the possible communication of the IP device. Alternatively, the constrained appropriate ICN names may be created according to the FW policy 510 of the local NAP 500.

In the case of WTRUs detaching from the NAP 500, the un-registration of interest in appropriate ICN names by determining the appropriate ICN name for the IP endpoint identifier 506 given to the locally detaching WTRU and removing the interest indication for this ICN name from the local ICN network.

Figure 6:
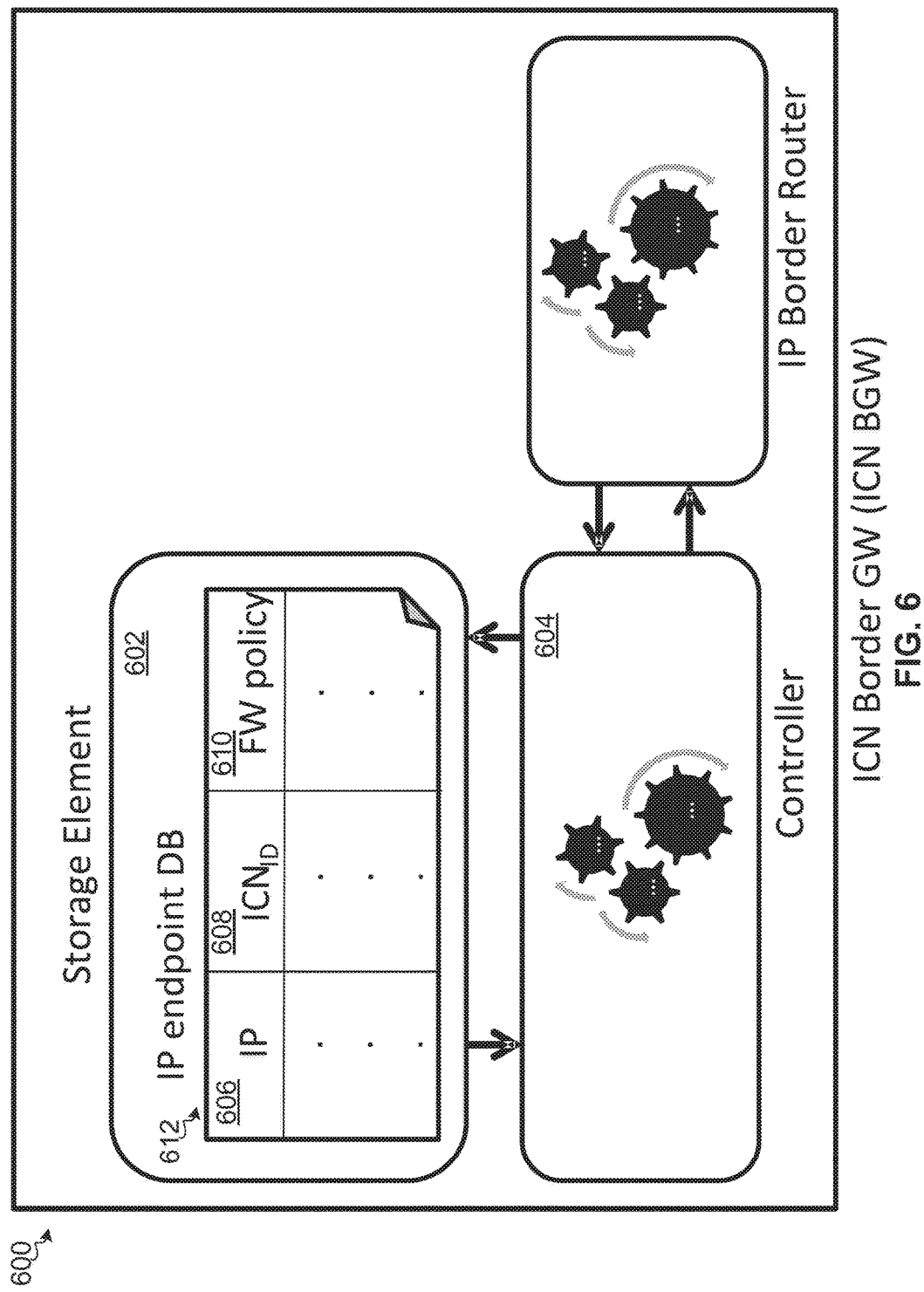
FIG. 6 is an ICN Border Gateway (GW)

Referring now to FIG. 6, an ICN Border Gateway (GW) 600 is shown. The ICN Border GW 600 may also include a storage element 602 and a controller 604.

The storage element 602 holding an IP endpoint database 612 may have the following columns: IP endpoint information 606, either as IPv4 or IPv6 identifier; ICN identifier information $ICN_{ID}$ 608 for this IP endpoint identifier; and a FW policy entry 610 that includes port limitations of the particular IP device.

The controller 604 may implement the reception of IP packets from any of its IP peer networks, the encapsulation of IP packets into ICN packets according to an ICN-specific format, the retrieval of the appropriate ICN name, in relation to the destination as given in the received IP packet, from the IP endpoint database, the addition of the appropriate ICN name to the generated ICN packet, and the publication of the ICN packet to its local ICN network.

Alternatively, an appropriate ICN name may be generated in case the corresponding IP identifier 606 cannot be found in the IP endpoint database 612. Alternatively, a constrained appropriate ICN name may be generated based on the FW policy 610 of the ICN border GW 600. Alternatively, the incoming packet may be discarded in case the IP endpoint identifier 606 retrieved from the incoming ICN packet does not belong to the agreed IP subnet served by the ICN network.

The controller 604 may also implement the reception of an ICN packet from its local ICN network, the decapsulation of the IP packet within the ICN packet according to an ICN-specific format, the retrieval of the IP endpoint identifier 606, in relation to ICN name as given in the received ICN packet, from the IP endpoint database 612, and the transmitting of the IP packet to the appropriate IP peer network. Alternatively, the packet may be discarded in case an appropriate IP route is not found.

The controller 604 may also implement the registration of interest in appropriate ICN names that represent IP devices outside of the local ICN network by determining the appropriate ICN name by retrieving it from the IP endpoint identifier 606 and indicating the interest in packets transmitted to this ICN name to the local ICN network.

Alternatively, an appropriate ICN name may be generated in case the corresponding IP identifier 606 cannot be found in the IP endpoint database 612. Alternatively, a constrained appropriate ICN name may be generated based on the FW policy 610 of the ICN border GW 600 in case the corresponding identifier cannot be found in the IP endpoint database 612.

Alternatively, an appropriate ICN name may indicate an interest for a specific IP subnet (instead of a fully qualified IP address). Alternatively, the constrained appropriate ICN name may indicate an interest.

In an example of NAP integration, NAP controller may be integrated as a standalone NAP, implementing the entire functionality of FIG. 5.

In an example of NAP add-on, the NAP controller and storage element may be provided in addition to a standard ICN NAP in the form of a software add-on. Depending on the software platform used for the ICN NAP, this add-on may be provided through a downloadable software module but may also be provided through frameworks such as Network Virtualization Function (NFV).

In an example of an operator-based central storage element, the storage element and look-up functionality, for example, the mapping of IP endpoint identifier onto appropriate ICN name, may be realized in an operator-based central element. Such centralization may, for instance, be realized for manageability reasons for the IP-ICN name mapping. In this case, the NAP controller may utilize remote connectivity to the central element to perform the IP-ICN name mapping.

In another embodiment, IP prefixing rather than the scope-based operation based on fully qualified IP addresses may be utilized. Embodiments may not depend on separation between IP addresses within the ICN operator and those outside the ICN operator's domain. This may significantly simplify the operations of the NAP and the GW, as well as reduce the delay for send operations.

Figure 7:
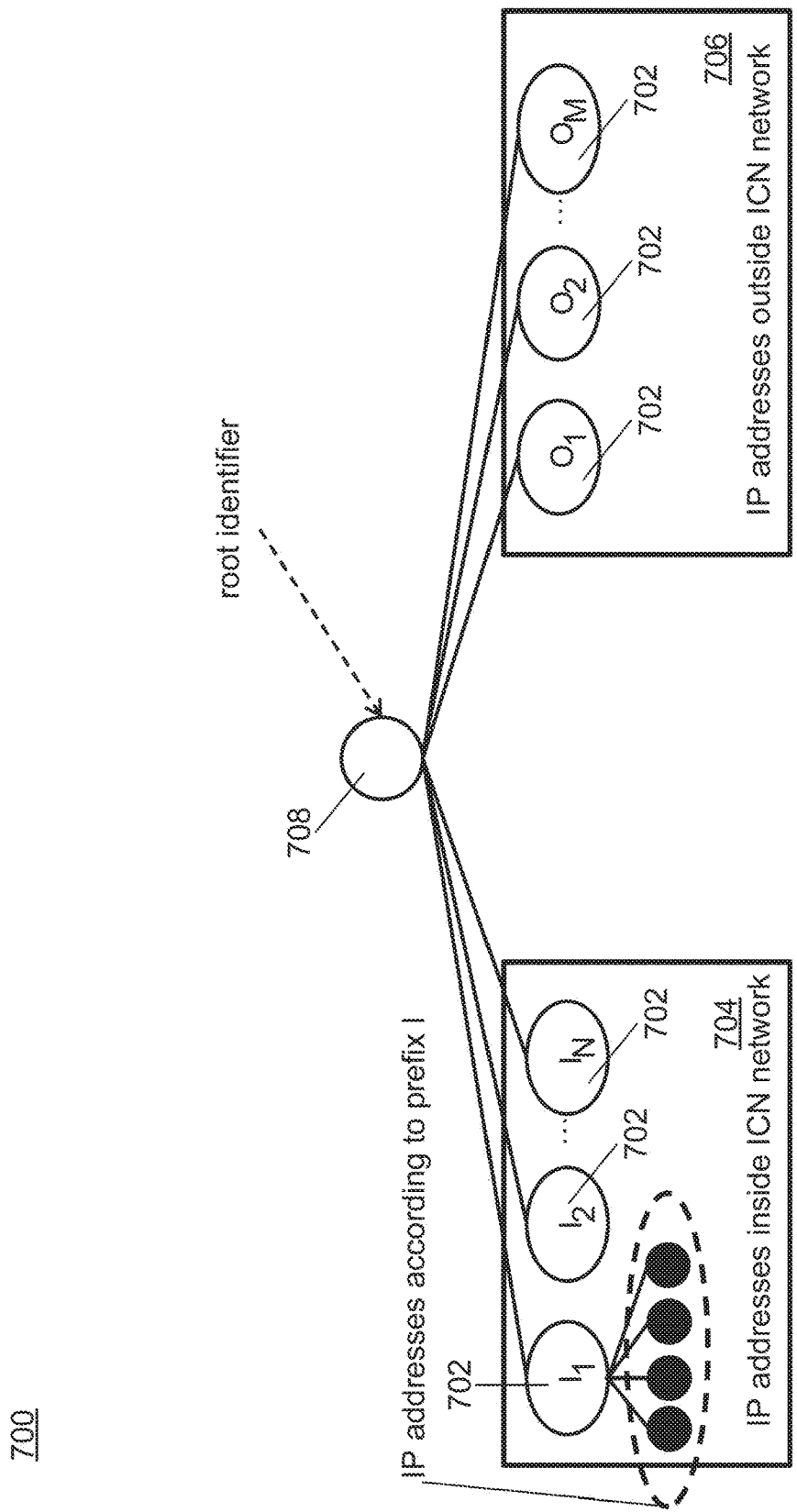
FIG. 7 is a diagram of another ICN name space.

Referring now to FIG. 7 a diagram 700 of another ICN name space is shown. In an embodiment, an IP address of any device communicating in an ICN network 704 may be interpreted as a communication pertaining to an appropriate ICN name. The communication follows a channel semantic in the sense that the IP packets sent via this channel (defined through the appropriate ICN name) are mutable information items at the ICN level. Publish-subscribe architectures such as PURSUIT allow for such mutable channel-like communications. This may mean that IP packets sent to a device with IP address $A_{IP}$ may actually be published to a mutable content named $A_{ICN}$. The content may be mutable because the same name is used for the mutable content that is defined by the IP packets sent to this IP address. Furthermore, any IP address residing outside the ICN network may be accordingly encoded as an appropriate ICN name.

For the overall ICN name space, a separate scope identifier, even a root identifier 708, may be chosen for IP-like communication. Using, for instance, a root identifier would allow for separating IP-like communication from other ICN communication (e.g., for operational or migration reasons). The root identifier may be standardized (e.g., agreed upon in an appropriate forum) or simply defined in a proprietary manner across ICNs of a certain vendor and/or operator. Under this root scope, there may be so-called prefix scopes 702, both for operator-internal IP prefix ranges as well as for external IP prefix ranges. These may be shown as $I_1$ to $I_N$ and $O_1$ to $O_M$ in FIG. 7, respectively.

The prefix scopes 702 may be determined through a combination of the IP address and subnet mask information of IP routing prefixes. In an embodiment, the IP address and subnet mask information can be hashed into a single identifier of fixed length (e.g., 256 bits in the case of a PURSUIT architecture) in order to determine a statistically unique scope identifier that represents the specific IP prefix information. For IP addresses outside the ICN network 706, the prefixes may be calculated and published, for example, under the root scope by an operator management system. This may be based on known IP prefix configurations of the IP border gateways (GWs) of the operator. In another embodiment, the prefixes may be calculated and published by the border GWs themselves according to their own configuration of the IP prefixes that they intend to serve. The IP prefixes for IP addresses inside the ICN network 704 may be published by an internal management entity (e.g., a separate IP address space management server or an extended Dynamic Host Configuration Protocol (DHCP) server).

The black circles in FIG. 7 may be the actual information identifiers 710 for the IP addresses, according to the IP prefix information that is represented by its father scope (here, $I_1$). In an embodiment, the information identifier 710 may be formed by hashing a fully qualified IP address (e.g., 10.0.10.4) into a single 256 bit identifier in a PURSUIT architecture through a "has" function $f$. With this, each scope may contain information items (and their data) that is compliant to the IP prefix information that the scope 702 represents.

The ICN name may be constrained with additional information. In addition to generating appropriate ICN names at the level of IP endpoint identifiers, an embodiment may utilize additional information of the IP-level communication to further constrain the communication being exchanged. The constraining information may be the source and/or destination port as well as the source IP address. In other words, the ICN name may be extended by, for example, the port information towards the ICN name of /Root/$I_1$/$f$(IP address)/$f$(port), where port may be a 16 bit integer value according to existing IP standards. In an embodiment in which several constraining parameters are used, a tuple input may be used for the function $f$. This extended form of an ICN name may be used for constraining communication to specific services defined through their port information. It should be noted that other constraints, similar to ports, may be added to the ICN name, such as destination port or other application flow specifying information.

Similar to the embodiments described above, the IP packets may be encapsulated in ICN packets. In an embodiment a generic ICN packet format may be used. The format may include the ICN name, a possible options header, and the payload. Accordingly, the encapsulation of IP packets may insert the appropriate ICN name into the appropriate packet header, set any appropriate options in the option header, and then copy the entirety of the IP packets into the payload of the ICN packet. In an embodiment, it may be necessary to fragment the ICN packet into smaller chunks. This operation may be performed along with the encapsulation of the IP packet.

Due to the realization at IP level, any protocol being realized on top of IP (e.g., TCP, RTP or HTTP) may be able to communicate via the mechanisms in the embodiments described herein. The communication may rely on the encapsulation of, for example, TCP packets into IP packets, which in turn may be encapsulated into ICN packets. Hence, in an example of a TCP-based application running at a UE with IP address $IP_A$ wanting to communicate with a server located at IP address $IP_B$ under the IP prefix $I_1$, the NAP to which the UE is connected may encapsulate any received packet from this UE into an ICN packet with the appropriate ICN name /Root/$I_1$/$f$($IP_B$).

It should be noted that the system components for embodiments described herein may be substantially similar to the system components described above with reference to FIGS. 3 and 4.

Figure 8:
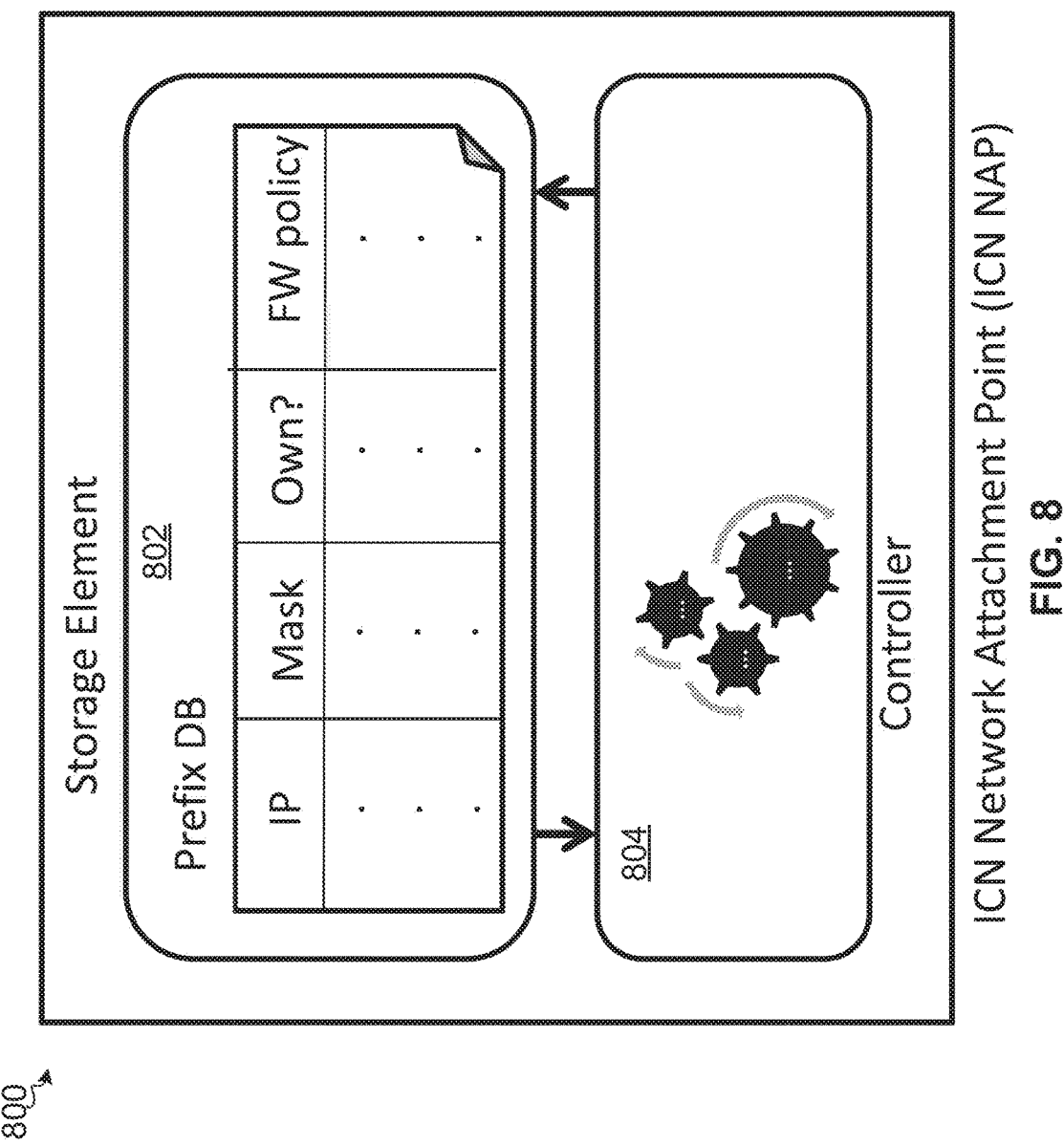
FIGS. 8 and 9 are illustrations of storage elements and databases that may exist in the ICN NAPs and in the ICN border GWs.
Figure 9:
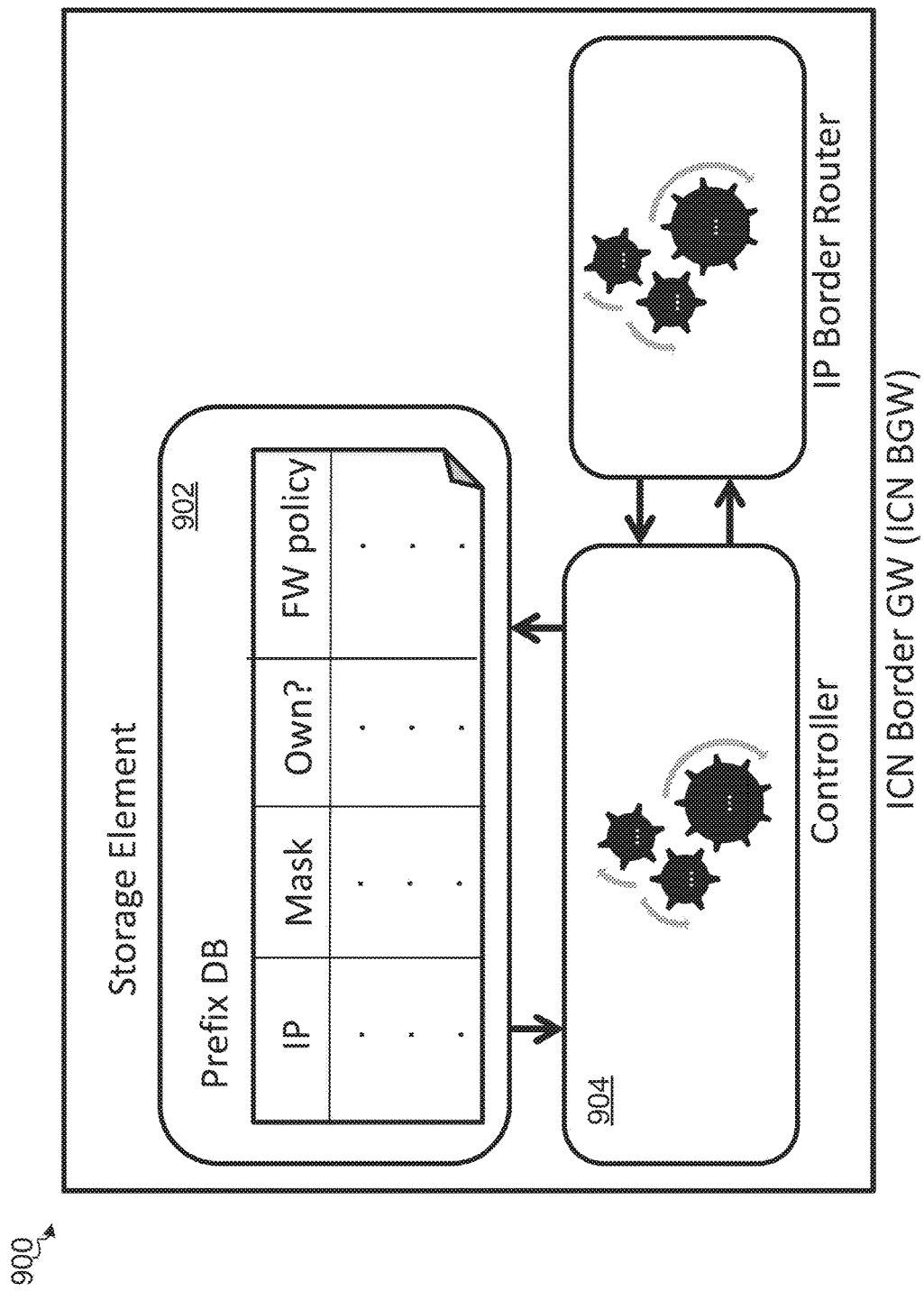

Referring now to FIG. 8 and FIG. 9, illustrations of storage elements and databases that may exist in the ICN NAPs 800 and in the ICN border GWs 900 for the embodiments described herein are shown. In an embodiment, the ICN NAP controller 804 may be integrated as a standalone ICN NAP, implementing the entire functionality of FIG. 8. In another embodiment, the ICN NAP controller 804 and storage element 802 may be provided in addition to a standard ICN NAP in the form of a software add-on. Depending on the software platform used for the ICN NAP, this add-on may be provided through a downloadable software module but may also be provided through frameworks such as Network Virtualization Function (NFV).

In another embodiment, the storage element 802 and look-up functionality (i.e., the mapping of an IP endpoint identifier onto an appropriate ICN name) may be realized in an operator-based central element. Such centralization may be realized, for example, for manageability reasons for the IP-ICN name mapping. In this case, the NAP controller 804 may utilize remote connectivity to the central element to perform the IP-ICN name mapping.

In an embodiment, the IP-based WTRU may execute a standard IP-enabled applications and services. This may be done by sending and receiving IP packets at its network interface. The IP-based WTRU may collaborate with another IP-based WTRU, which may be in an ICN network (FIG. 3) or in an IP-based network (FIG. 4).

The one or more ICN NAPs 304, 404 may store a list of IP prefixes in an internal storage component. In an embodiment, the list of IP prefixes may be provided through a configuration file. In another embodiment, the list of IP prefixes may be provided through a bootstrapping procedure, for example, in a DHCP attachment phase. In another embodiment, an announcement protocol may be used to frequently announce the known IP prefix information in an ICN operator domain.

The one or more ICN NAPs 304, 404 may receive IP packets from the IP-based WTRUs 302, 402. When the IP packets are received, the one or more ICN NAPs 304, 404 may encapsulate the packets into an appropriate ICN format. The one or more ICN NAPs 304, 404 may determine the appropriate ICN name by hashing the destination IP address into a single information identifier. The one or more ICN NAPs 304, 404 may determine the prefix scope (FIG. 7) by performing a prefix match operation on the destination IP address, based on all known IP prefixes in its internal database. If no matching prefix is found, the received packet may be discarded. The one or more ICN NAPs 304, 404 may determine any constraining information, such as port or other information.

The one or more ICN NAPs 304, 404 may publish the ICN packet to the appropriate ICN name according to the ICN namespace (FIG. 7) in its local ICN network 306, 412. The ICN namespace may be formed through the prefix information and IP address information as well as any optional constraint information as determined in the previous steps.

The one or more ICN NAPs 304, 404 may receive ICN packets from the local ICN network 306, 412. The one or more ICN NAPs 304, 404 may decapsulate the payload of the ICN packet as an IP packet. The one or more ICN NAPs 304, 404 may send the IP packet to the appropriate network interface, based on the appropriate ICN name information provided in the ICN packet. Alternatively, the one or more ICN NAPs 304, 404 may execute any firewall policy that may reside at the ICN NAP 304, 404 regarding the IP packet based on, for example, port configuration, address range of source, and/or destination.

The one or more ICN NAPs 304, 404 may register interest in appropriate ICN names on behalf of the locally connected IP-based WTRUs 302, 402. This may be performed by determining the appropriate prefix scope according to the ICN NAP's 304, 404 own prefix information. This may be determined through the prefix DB entries that indicate the own prefix space, for example, in the Own? column (FIG. 8). The ICN NAP 304, 404 may then subscribe to the appropriate ICN name, according to the ICN namespace (FIG. 7) and the determined prefix scope. Alternatively, the ICN NAP 304, 404 may subscribe to the entire own prefix scope only for NAPs serving prefixes rather than only individual IP addresses.

The ICN border GW 410 may store a list of IP prefixes in its internal storage component. In an embodiment, the list of IP prefixes may be provided through a configuration file. In another embodiment, the list of IP prefixes may be provided through a bootstrapping procedure. In another embodiment, an announcement protocol may be used to frequently announce the known IP prefix information in the ICN operator domain.

The ICN border GW 410 may receive an IP packet from a peer IP network. The ICN border GW 410 may encapsulate the IP packet into an ICN packet. The ICN border GW 410 may determine the appropriate ICN name by hashing the destination IP address into a single information identifier. The prefix scope may be further determined, as described above with reference to FIG. 7, by performing a prefix match operation on the destination IP address, based on all known IP prefixes in the internal database of the ICN border GW 410. If no matching prefix is found, the ICN border GW 410 may discard the receiving packet. The ICN border GW 410 may further determine any constraining information, such as port or other information.

The ICN border GW 410 may publish the ICN packet to the appropriate ICN name in its local ICN network, according to the ICN namespace (FIG. 7), formed through the prefix information and IP address information determined as described above. Alternatively, the ICN border GW 410 may discard the packet if the found prefix information violates any defined firewall policy for the address range related to the received IP packet (e.g., wrong protocol type or wrong port being used).

The ICN border GW 410 may receive an ICN packet from its local ICN 412. The ICN border GW 410 may decapsulate the ICN packet as an IP packet. The ICN border GW 410 may send the IP packet to an IP peer network, according to the IP prefix information, via one of its IP-based network interfaces. Alternatively, the ICN border GW 410 may execute any firewall policy that may reside at the ICN NAP 404 regarding the IP packet, based on, for example, port configuration, address range of source, and/or destination.

The ICN border GW 410 may register interest in IP packets on behalf of the IP address space locally allocated to the ICN border GW 410, as determined through the prefix DB entries that indicate the own prefix space, for example, in the Own? column (FIG. 9).

The ICN border GW 410 may register interest in appropriate ICN names on behalf of the local ICN network 412. This may be performed by consulting the prefix configuration in an internal database of the ICN border GW 410. In other words, the ICN border GW 410 may filter the prefix DB according to the Own? column (FIG. 9). The ICN border GW 410 may then subscribe to the appropriate IP prefix scopes, according to the ICN namespace (FIG. 7) as determined above.

Embodiments may enable the communication between two IP-based devices connected to an ICN, or one IP-based device connected to an ICN network while another IP-based device is connected either to an ICN network or IP network. IP packets originating from an IP-based device may be forwarded via an ICN network. IP packets received via an ICN network may be forwarded to an IP-based device. In an embodiment, IP packets originating from an IP-based device may be forwarded and received via an ICN network towards another IP network. In an embodiment, IP packets received by an ICN network may be forwarded towards an IP-based device via the ICN network.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of anchoring communication between Internet Protocol (IP)-based devices in an information centric networking (ICN) network or across an IP peer network, the method comprising:
receiving, by a network access point (NAP) of an ICN network, an IP packet from an IP-only wireless transmit/receive unit (WTRU);

determining, by the NAP, an appropriate ICN name for the IP packet based on an IP address of an intended destination of the IP packet, wherein the ICN name comprises a hierarchy of a root identifier for IP over ICN communication, a first sub-scope identifier for within ICN communication and a second sub-scope identifier for outside ICN communication below the root identifier, and one or more levels of IP subnet identifiers below the first sub-scope identifier and the second sub-scope identifier;

encapsulating, by the NAP, the IP packet into an ICN packet by inserting the ICN name into a packet header; and sending, by the NAP, the ICN packet to a plurality of devices subscribed to the ICN name.

2. The method of claim 1, wherein each of the one or more levels of IP subnet identifiers comprise a group of the IP address.

3. The method of claim 1, wherein the IP address is in IPv4 format and each of the one or more levels of IP subnet identifiers comprise a decimal number representing 8 bits of the IP address.

4. The method of claim 1, wherein the IP address is in IPv6 format and each of the one or more levels of IP subnet identifiers comprise a group of four hexadecimal digits representing 16 bits of the IP address.

5. The method of claim 1, wherein the root identifier comprises:

first prefix scopes for IP operator-internal IP prefix ranges; and second prefix scopes for scopes for external IP prefix ranges.

6. The method of claim 5, wherein the first prefix scopes and the second prefix scopes are determined through a combination of the IP address and subnet mask information of IP routing prefixes.

7. The method of claim 5, wherein the second prefix scopes are calculated and published under the root scope by an operator management system based on known IP prefix configurations of an IP border gateway (GW) of the operator.

8. The method of claim 5, wherein the second prefix scopes are calculated and published by an IP border gateway (GW).

9. The method of claim 5, wherein the first prefix scopes are published by an internal management entity.

10. The method of claim 1, wherein the one or more of the plurality of devices are subscribed to different levels of the IP subnet identifiers.

11. An information centric networking (ICN) network access point (NAP) for anchoring communication between Internet Protocol (IP)-based devices in an ICN network or across an IP peer network, the NAP comprising:

a circuitry configured to receive an IP packet from an IP-only wireless transmit/receive unit (WTRU);

the circuitry further configured to determine an appropriate ICN name for the IP packet based on an IP address of an intended destination of the IP packet, wherein the ICN name comprises a hierarchy of a root identifier for IP over ICN communication, a first sub-scope identifier for within ICN communication and a second sub-scope identifier for outside ICN communication below the root identifier, and one or more levels of IP subnet identifiers below the first sub-scope identifier and the second sub-scope identifier;

encapsulate the IP packet into an ICN packet by inserting the ICN name into a packet header; and the circuitry further configured to send the ICN packet to a plurality of devices subscribed to the ICN name.

12. The NAP of claim 11, wherein each of the one or more levels of IP subnet identifiers comprise a group of the IP address.

13. The NAP of claim 11, wherein the IP address is in IPv4 format and each of the one or more levels of IP subnet identifiers comprise a decimal number representing 8 bits of the IP address.

14. The NAP of claim 11, wherein the IP address is in IPv6 format and each of the one or more levels of IP subnet identifiers comprise a group of four hexadecimal digits representing 16 bits of the IP address.

15. The NAP of claim 11, wherein the root identifier comprises:

first prefix scopes for IP operator-internal IP prefix ranges; and second prefix scopes for scopes for external IP prefix ranges.

16. The NAP of claim 15, wherein the first prefix scopes and the second prefix scopes are determined through a combination of the IP address and subnet mask information of IP routing prefixes.

17. The NAP of claim 15, wherein the second prefix scopes are calculated and published under the root scope by an operator management system based on known IP prefix configurations of an IP border gateway (GW) of the operator.

18. The NAP of claim 15, wherein the second prefix scopes are calculated and published by an IP border gateway (GW).

19. The NAP of claim 15, wherein the first prefix scopes are published by an internal management entity.

20. The NAP of claim 11, wherein the one or more of the plurality of devices are subscribed to different levels of the IP subnet identifiers.

* * * * *